United States Patent [19]

Hill et al.

[11] 4,338,818

[45] Jul. 13, 1982

[54] METHOD FOR DETERMINING ERROR SOURCES IN A WHEEL BALANCER

[75] Inventors: Jerry M. Hill, North Little Rock; Ronald W. Carter, Conway, both of Ark.

[73] Assignee: FMC Corporation, Chicago, Ill.

[21] Appl. No.: 172,724

[22] Filed: Jul. 28, 1980

[51] Int. Cl.³ .............................................. G01M 1/22
[52] U.S. Cl. ....................................... 73/462; 73/1 B
[58] Field of Search ................. 73/1 B, 462, 463, 464, 73/465; 364/508, 571

[56] References Cited

U.S. PATENT DOCUMENTS

| | | | |
|---|---|---|---|
| 3,741,016 | 6/1973 | Hofmann | 73/462 |
| 3,785,210 | 1/1974 | Mueller | 73/459 |
| 3,788,147 | 1/1974 | Mueller | 73/459 |
| 3,826,146 | 7/1974 | Mueller | 73/462 |
| 4,015,480 | 4/1977 | Giers | 73/462 |
| 4,046,017 | 9/1977 | Hill | 73/462 |
| 4,085,619 | 4/1977 | Shapiro et al. | 73/462 |
| 4,169,383 | 10/1979 | Guyot et al. | 73/462 |
| 4,173,146 | 11/1979 | Kogler et al. | 73/462 |
| 4,198,677 | 4/1980 | Brunner et al. | 364/571 |
| 4,250,555 | 2/1981 | Mitchell et al. | 73/462 |
| 4,285,240 | 8/1981 | Gold | 73/462 |

FOREIGN PATENT DOCUMENTS

1511141 5/1978 United Kingdom .

Primary Examiner—James J. Gill
Attorney, Agent, or Firm—H. M. Stanley; R. B. Megley

[57] ABSTRACT

Force transducers are coupled to the shaft of a wheel unbalance measuring device to provide periodic electrical signals indicative of unbalance forces. Operation of the system while a known unbalance is mounted on the shaft provides data from which calibration constants for the system are calculated. The measuring system is adaptable to implement certain system self diagnostic processes. The system may continuously drive the shaft and display the force transducer output peak values so that the transducers may be monitored for excessive noise and for normal operation. The balancer shaft may also be run continuously and two plane unbalance displayed so that the stability of the system may be monitored. In each of the latter two diagnostic capabilities readings are taken by the system over a predetermined number of shaft revolutions so that noise frequencies imparted to the data by the drive components may be substantially eliminated.

30 Claims, 3 Drawing Figures

FIG_1

FIG_3

METHOD FOR DETERMINING ERROR SOURCES IN A WHEEL BALANCER

BACKGROUND OF THE INVENTION

1. Field of the Invention

This invention relates to a method for measuring and displaying characteristics of a system for detecting unbalance in a rotating body and more particularly to such a method by which error contribution from portions of the system is determined.

2. Description of the Prior Art

A wheel balancing apparatus is disclosed in copending application Ser. No. 111,159 filed Jan. 11, 1980 commonly owned by the Assignee of the instant invention now U.S. Pat. No. 4,285,240. The wheel balancer provides for measurement of the unbalance in a rotating body and resolves the unbalance in either one or two planes normal to the axis of rotation to the body. A force transducer is mechanically coupled to a rotating shaft on which the rotatable body is mounted and provides an electrical signal which is indicative of the periodic force at the transducer generated by the unbalance mass in the body during rotation. An analog-to-digital converter receives the electrical signal from the transducer and provides a digital word output which corresponds to the instantaneous magnitude of the periodic force. The system includes a control for the analog-to-digital converter so that the electrical signals are sampled at a predetermined number of angular increments during each revolution of the rotating shaft. A memory is also provided which contains a plurality of stored digital sine and cosine representative quantities, each of which correspond to one or more of the predetermined angular increments. During the time that the rotating shaft is traversing each of the angular increments the control operates on each of the digital words in accordance with the corresponding sine and cosine representative quantities to provide modified quantities having sine and cosine factors. The quantities including the sine and cosine factors are obtained within an execution time which is reduced by appropriate selection of the stored digital sine and cosine representative quantities. The system sums the modified quantities obtained during excursion through each of the angular increments so that data is provided from which a determination of the unbalance mass magnitude and angular location may be made.

SUMMARY OF THE INVENTION

The instant invention relates to a method for detecting errors which effect the measurement of mass unbalance magnitude and location in a wheel balancing machine. The machine has a rotatable shaft with wheel mounting structure attached thereto. A framework is provided for supporting the shaft. A motor is also provided which is mounted in the framework and which is coupled to rotationally drive the shaft. Force transducers are positioned between the framework and the shaft and provide outputs which are indicative of mass unbalance in the shaft as well as any structure which is attached to the shaft during shaft rotation. A display is provided which carries intelligible information relating to the unbalance test. A processor is included in the system which operates to monitor the output from the force transducers, to control the drive motor and to provide signals which are coupled to the display and which are indicative of the mass unbalance. Memory is included which is associated with the processor and which operates to store unloaded shaft unbalance and force transducer calibration data. The method includes the steps of continuously driving the shaft rotationally to assume a speed within a predetermined speed range. Thereafter, the force transducer outputs are sensed and filtered to retain the fundamental output frequency and to attenuate harmonic frequencies. The filtered outputs are corrected with the unloaded shaft unbalance data and the transducer forces are calculated from the corrected filtered outputs throughout a predetermined number of shaft revolutions. The balance weight and position necessary to counterbalance the mass unbalance thus measured is calculated utilizing the calculated transducer forces and arbitrary wheel parameters. The foregoing sequence of steps is repeated for a series of periods defined by the predetermined number of shaft revolutions, so that a series of compensation weight values and angular position indications is obtained which is indicative of the stability of the system. While the system is being operated continuously the displays may also be driven to provide indication of the peak force transducer outputs. The stability and functional integrity of the system is indicated by the stability of the displays while the shaft is being continuously driven. The unloaded shaft unbalance data may be recalled from memory and displayed so that it may be determined that the shaft unbalance is not of such a magnitude as to use up more than an acceptable portion of the balancer dynamic range.

DESCRIPTION OF THE PREFERRED EMBODIMENT

Figure 1:
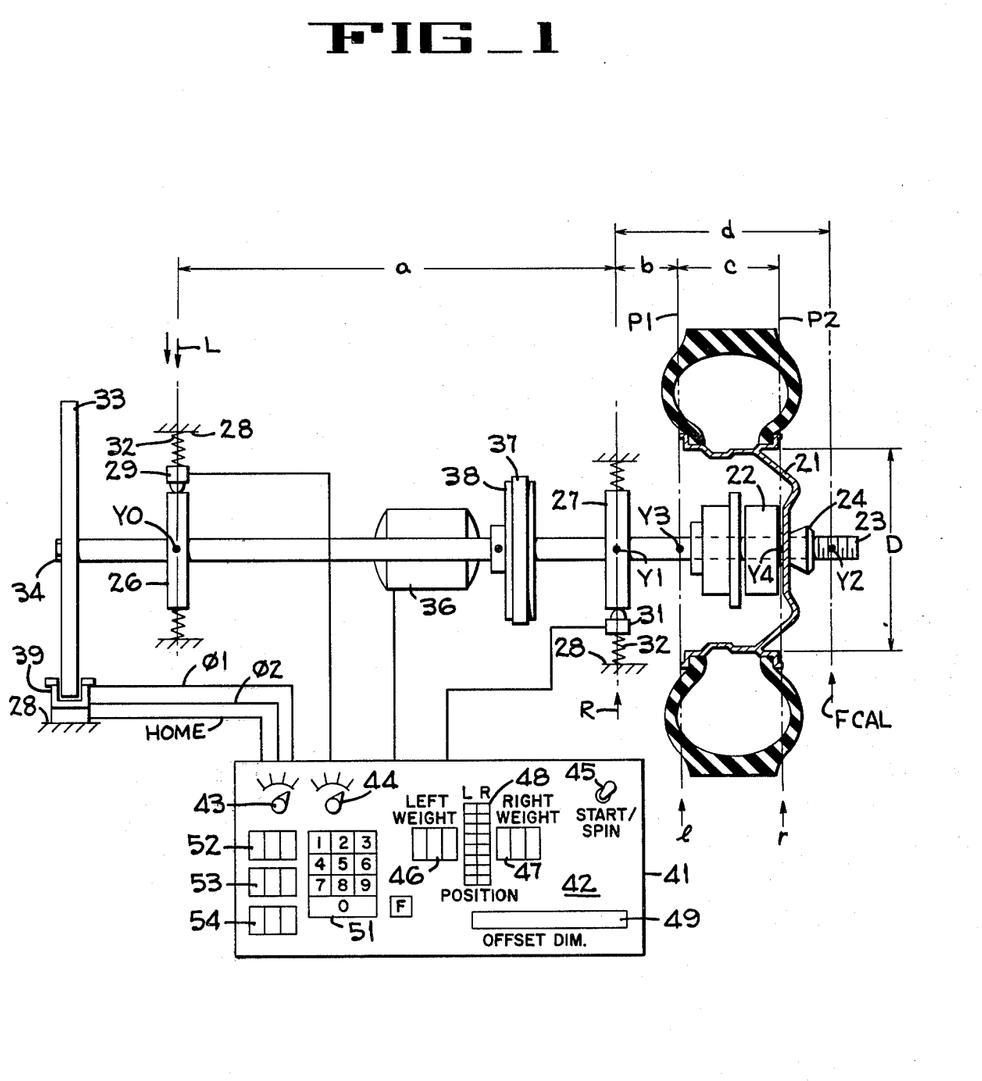
FIG. 1 is a diagrammatic plan view of an unbalance measurement system by means of which the method of the present invention may be practiced.

In FIG. 1 of the drawings a conventional mechanical arrangement is shown for measurement of an unbalance mass in a rotating body. The unbalance mass produces an unbalance force when the body is spun. As depicted therein an automobile rim and tire combination 21 is shown as the rotating body securely mounted against a shoulder member 22 which is attached to the end of a rotating shaft 23. The rim portion of the rim and tire combination has the usual centrally disposed hole which fits over the end of the shaft 23. The rim is held tightly in place by a wheel clamp 24 which engages threads formed on the end of the shaft 23. A pair of bearing housings 26 and 27 are resiliently supported within a fixed, rigid framework 28. The shaft 23 is supported on inner bearing members within the bearing housings 26 and 27, thereby being disposed for rotational motion within the framework 28. Left and right force transducers 29 and 31, respectively are positioned between the framework 28 and the bearing housings 26 and 27. A resilient spring 32 is positioned between each of the force transducers and the framework to maintain the force transducers 29 and 31 in continuous contact with the bearing housings 26 and 27.

An encoder disc 33 having an array of peripheral apertures therein (not shown) is secured to the end of the shaft 23 opposite the end carrying the rim and tire combination 21 by means of a nut 34 and therefore rotates with the shaft. A motor 36 is mounted on the framework 28 functioning to drive the shaft 23 rotationally through a belt 37 and a pulley 38 which is fixedly mounted on the shaft 23.

A photosensor and light source assembly 39 is mounted on the framework 28 adjacent to the edge of the encoder disc 33. Signals provided by the photosensor and light source assembly 39 are connected to circuitry contained within a console 41 having a front panel 42 thereon. The signals provided by the photosensor and light source assembly are three in number, said signals being labeled in FIG. 1 as $\phi 1$, $\phi 2$ and "home", or reference. Force transducers 29 and 31 are also connected to the electronic circuitry contained in console 41 as is the motor 36. The mechanical arrangement of the wheel unbalance measuring device as disclosed herein to this point may be of the type described in U.S. Pat. No. 4,046,017 issued to Hill.

Switches and displays for setting and monitoring the unbalance measurement are shown on the front panel 42. A start/spin switch 45 is seen in FIG. 1 which initiates a shaft spin routine. A multiposition machine mode switch 43 and a multiposition display mode switch 44 are positioned on the front panel 42. The machine mode switch 43 may be set to select a run mode, a calibrate mode or a zero shaft unbalance mode. The display mode switch 44 may be set to select a display of ounces, ounces rounded off, grams or grams rounded off. The displayed units as selected appear in three place left and right unbalance weight indication windows 46 and 47. Left and right position indicators 48 provide angular information indicative of where weights should be attached at the rim of the rim and tire combination 21 to counterbalance the measured unbalance mass. A conventional offset dimension measurement gauge 49 is provided on the front panel 42 from which a convenient reading of the axial position of the rim and tire assembly 21 on the shaft 23 may be obtained. Rim and tire assembly physical parameters are entered into the system by means of a keyboard 51. The offset dimension is entered by appropriate selection of the switches shown on the front panel 42 as are parameters indicative of the wheel diameter and width. The offset is represented in FIG. 1 by the letter "b". The width of the wheel assembly 21 is taken between the two planes, seen as P1 and P2 in FIG. 1, at which counterbalancing weights may be applied to the rims of the wheel assembly. Wheel width is represented in the diagram by the letter "c". The selected diameter, width and offset values are displayed in the three place displays 52, 53 and 54 respectively.

As stated hereinbefore, the force measuring mechanism is similar to that which has been utilized previously inasmuch as forces are sensed by two force transducers which measure all of the forces required to maintain the rotating shaft in a position within the horizontal plane as depicted in the view of FIG. 1. The encoder disc 33 and the photosensor and light source assembly 39 perform as an optical shaft encoder for the wheel balancing shaft 23. A "home" position is measured for the shaft rotation and occurs once for each rotation of the shaft. The "home" position provides an angular reference and rotationally locates a number of calibration constants with respect to the angular position of the shaft. The calibration constants are used to reduce errors introduced into the measurement of unbalance in the rotating body. The unbalance forces are measured when the shaft is spun while loaded with a known calibrating weight and are also measured when the shaft 23 is spun unloaded. Calculations as disclosed in the aforementioned patent application U.S. Ser. No. 111,159 are performed involving the transducer calibration and zero unbalance data, and the results are stored for later use in the solution of unbalance force equations when an unbalanced body is mounted on the shaft and rotated.

The unbalance force equations deal with the unbalance vectors and associated constants which are presumed to be free of any electrical or mechanical noninformation bearing noise signals. The unbalance vectors therefore represent only the sinusoidally varying components of the actual rotating body unbalance, or the calibration weight unbalance, or the unloaded shaft unbalance as the shaft rotates. The freedom from noise presumption is justified by the following considerations. The unbalance force signals from the transducers are digitized and sampled, as will hereinafter be described, at discrete angular increments of shaft rotation as determined by the pattern of apertures in the disc 33. The sampling of data and summing of the sampled data rejects nonharmonic noise having frequencies less than one half the sampling frequency as is well known by those of skill in this art. Harmonic noise is rejected by the operations which produce combined quantities containing sine and cosine factors and the subsequent summation. The process performed by the apparatus includes the extraction of the Fourier series coefficients for the fundamental sine and cosine components in the processed data outputs. The processed data is obtained by operating on the force transducer output signals with numbers representative of the sine and the cosine of the shaft angle at the instant the output exists to obtain quantities containing sine factors and quantities containing cosine factors, and by subsequently undertaking independent summations (integrations) of the sine factor quantities and of the cosine factor quantities. The processing is carried out digitally by digitizing the transducer outputs and the quantities representative of the sine and the cosine of the shaft angular position and by performing the operation on the digitized transducer outputs at predetermined angular positions of the shaft. The sine and cosine representative quantities are selected so that they tend to reduce the contribution of harmonics to the processed data. Consequently, the processed data in the form of the sine and cosine summations is relatively free of harmonic content. The development of the mass unbalance measurement equations is undertaken in copending U.S. patent application Ser. No. 111,159 and is incorporated herein by reference.

Previously referenced U.S. patent application Ser. No. 111,159 also describes the derivation of the actual calibrating constants for the left and right transducers 29 and 31. A calibrating weight of known magnitude is attached to the shaft 23 at a known angular position at a point indicated as Y2 thereon (FIG. 1). When the rotating shaft 23 is spun about the shaft axis a reaction force L is applied at the point Y0 on the shaft and a reaction force R is applied at point Y1 on the shaft to counteract the force due to the mass unbalance imposed by the calibrating weight and to maintain the shaft in static equilibrium. The force imposed at the point Y2 on the shaft 23 by the calibrating weight is the calibrating force.

As also shown in FIG. 1 it may be seen that an initially unbalanced shaft 23 may be spun without any external calibration weight or body to be balanced, such as an automobile wheel, mounted thereon. Any voltage vector which appears then corresponds to unbalance in the shaft alone. These voltage vector magnitudes and phases are stored and subsequently subtracted from the summations or integrals obtained when the shaft is spun with either an external calibration weight or a wheel assembly applied thereto. The resulting integrals or summations represent the unbalance forces which are due only to the externally applied weight or the rotating body mounted on the shaft 23.

Figure 2:
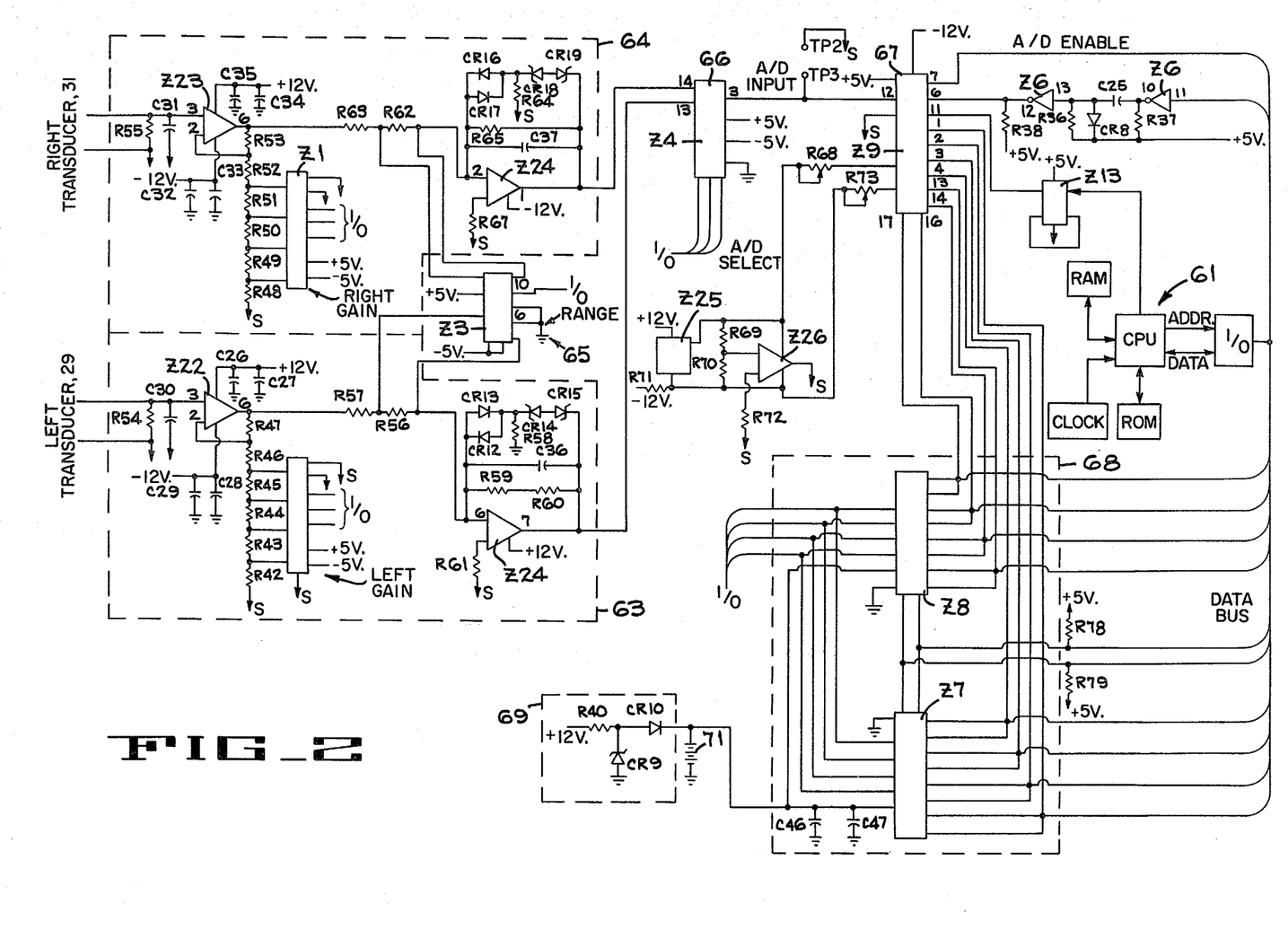
FIG. 2 is an electrical schematic diagram of a portion of the system illustrated in FIG. 1.

The left and right force transducers 29 and 31 as seen in FIG. 2 have their outputs coupled to conditioning circuits 63 and 64 respectively for the purpose of providing required signal amplitudes and some high frequency filtering. A range control 65 is provided for the transducer signal conditioning circuits so that a convenient scale factor is obtained for the conditioned signals. The range is selected by a control signal from the computer in a fashion described in copending application Ser. No. 111,159. In that embodiment the range control provides for a low range from 0 to 7 ounces in 0.05 ounce increments. A high range from 7 to 20 ounces provides readout in 0.1 ounce increments. The conditional transducer signals are coupled to a multiplexer 66, which alternately passes the conditioned left and right transducer signals in analog form to an analog-to-digital (A/D) converter 67. The output from the A/D converter is provided in the form of digitized left and right transducer signals as data to a computer 61. It should be noted that the computer controls the gain of the input conditioning circuits 63 and 64 and provides the address function for the multiplexer 66. Computer 61 also enables and starts the A/D conversion accomplished in the converter 67.

A nonvolatile random access memory (RAM) 68 is provided which is coupled to the computer 61. The RAM 68 stores calibration and shaft unbalance constants obtained from calculations performed by the computer 61 and serves to provide the stored information on call by the computer. Power is provided to a trickle charge circuit 69 which maintains a battery 71 in a freshly charged state. The battery 71 provides the power for the RAM 68 so that a power failure or machine shut-down will not allow loss of the data stored in the memory. The computer 61 serves to provide an address for the RAM when storing or recovering data.

A mechanical guard (not shown) is provided to cover the rotating body mounted on the shaft 23 during an unbalance measurement run. The guard is intended for the safety of the operator and other personnel in the immediate vicinity and has a guard interlock coupled thereto which provides a stop interrupt signal to the computer 61 when the guard is raised. A conventional stop function is also provided which transmits a stop interrupt signal to computer 61 when selected. An array of input switches and keyboard switches operated by the controls appearing on the front console 42 is scanned by a thirty-two line multiplexer. This multiplexer is addressed in sequence by the computer 61 and provides the scanned data to the computer. A plurality of displays are energized by the computer 61 in accordance with the data processed therein. The displays are seen on the front panel 42. The computer 61 also provides forward and reverse commands to a motor control which relays motor power to the motor 36.

The electrical schematic of FIG. 2 shows the input portions of the circuitry for the signals from the right and left force transducers 31 and 29. The electrical signal from the right force transducer 31 is coupled to the noninverting input pin 3 of an amplifier Z23 in the input conditioning circuit 64.

A multiplexer Z1 is also included which operates to select ones of the input resistors R48-R52 for adjustment of the gain of the amplifier Z23. The multiplexer Z1 is controlled by gain select signals from the computer 61. The amplitude of the output at pin 6 of amplifier Z23 is therefore controlled in magnitude by the computer and coupled to the input pin 2 of one section of an amplifier Z24. The gain of the amplifier section Z24 at pin 1 thereof is a function of the input resistors R62 and R63 together with the feedback resistor R65. The gain at pin 1 is controlled by a range control signal from the processor 61 coupled to pin 10 of a range multiplexer Z3. The range multiplexer Z3 selectively removes the resistor R62 from the series combination of R63 and R62 at the input pin 2 of amplifier Z24, resistors R63 and R62 having appropriate values so that a 4:1 gain change is provided. Thus, a conditioned and amplified right force transducer signal is provided at the output pin 1 of amplifier Z24 which is coupled to input pin 14 of the multiplexer Z4 seen as item 66 in FIG. 2.

The electrical signal from the left force transducer 29 is conditioned in a fashion similar to that for the signal from the right force transducer. The left force transducer signal is coupled to the noninverted input pin 3 of an amplifier Z22. A multiplexer Z2 is connected to provide a predetermined series combination of the resistors R42-R46 at the input pin 2 of amplifier Z22. In the same manner as the gain is controlled for the amplifier Z23 receiving the right force transducer signal, the computer 61 provides control from processor 61 to select the desired input impedance at pin 2 of the amplifier Z22 in the input conditioning circuit 63, and therefore controls the gain at the output pin 6 thereof. The range control 65, represented by the multiplexer Z3 in the schematic diagram of FIG. 2, selects the amplification range at pin 7 of the amplifier Z24 as follows. When the range multiplexer Z3 retains the input resistance R56 at pin 6 of the amplifier Z24 the high range is selected. Conversely, when the range multiplexer removes resistance R56 from the input of the amplifier the low range is selected. It should be noted that the amplification for the left transducer signal at pin 7 of amplifier Z24 is approximately twice that of the right transducer signal at pin 1 of amplifier Z24 for similar input resistances. The circuit is constructed in this fashion because the signal provided by the left force transducer is inherently smaller than that provided by the right force transducer. This may be seen by reference to FIG. 1 wherein it is clear that an unbalance force imposed on the system by a rotating body, such as the tire and rim assembly 21, will be counteracted by a lesser force at a greater lever arm at the left force transducer than is required at the lesser lever arm at the right force transducer. The amplified electrical signal from the left force transducer is coupled to pin 13 of the multiplexer Z4, seen as item 66 in FIG. 2.

The conditioned signals from the right and left force transducers are coupled to the multiplexer Z4 so that they may be passed alternately to the A/D converter Z9. Multiplexer Z4 is controlled by the computer 61 operates to alternately select the conditioned right force transducer signal and the conditioned left force transducer signal to appear at the output pin 3 thereof. The multiplexed force transducer signals are coupled to the input pin 12 on the A/D converter Z9, seen as item 67 in FIG. 2.

Analog-to-digital converter Z9 is a tristate device providing output bits which are high or low in the active mode and presenting a high impedance when in the inactive mode. Devices Z7 and Z8 in the random access memory 68 are also tristate devices. The analog-to-digital converter Z9 and the random access memory devices Z7 and Z8 are activated alternately. Consequently, the 8-bit digital output from the analog-to-digital converter may be combined on the same data bus with the data from the random access memory 68. The digitized force transducer signals appears at pins 1-4, 13, 14, 16 and 17 of the converter Z9 and are coupled to the computer 61. The random access memory 68 is addressed by the computer 61 and provides memory data on the data bus which is fed to the computer 61.

The random access memory 68 is termed a nonvolatile RAM because it is coupled to the circuitry 69 (FIG. 2) which prevents the memory data from being lost in the event of power failure to the system or when system power is purposely turned off. The battery 71 is trickle charged from an appropriate DC source through a resistor R40 and is regulated at 7.5 volts by the zener diode CR9. The charge energy is passed by the diode CR10 into the battery 71 and to the power input pin for the RAM 68. If the DC power supply fails, the battery 71 continues to provide power to retain the data in memory. The random access memory 68 stores the settings for the gain selection made at the gain multiplexers Z1 and Z2, as well as the calibration constants discussed in copending application serial number 111,159 and the zero shaft unbalance constants also discussed therein.

The analog-to-digital converter 67 is coupled to a two-megacycle clock through a divide-by-two circuit Z13. The enabling input at pin 7 of the A/D converter 67 is connected to the computer 61. A very short pulse, in the order of two microseconds in width, is required at the input pin 6 for the A/D converter 67 to start the analog-to-digital conversion. This pulse is obtained by receiving a ten microsecond pulse from the computer 61 at the input pin 11 of an inverter Z6. The inverter ten microsecond pulse is differentiated in the circuitry containing capacitor C25 and resistor R36. The steep leading edge of the inverted pulse provides a negative going spike which is coupled to the input pin 13 of a second inverter Z6, thereby providing a squared, positive going approximately 2 microsecond spike at the output pin 12 thereof.

Figure 3:
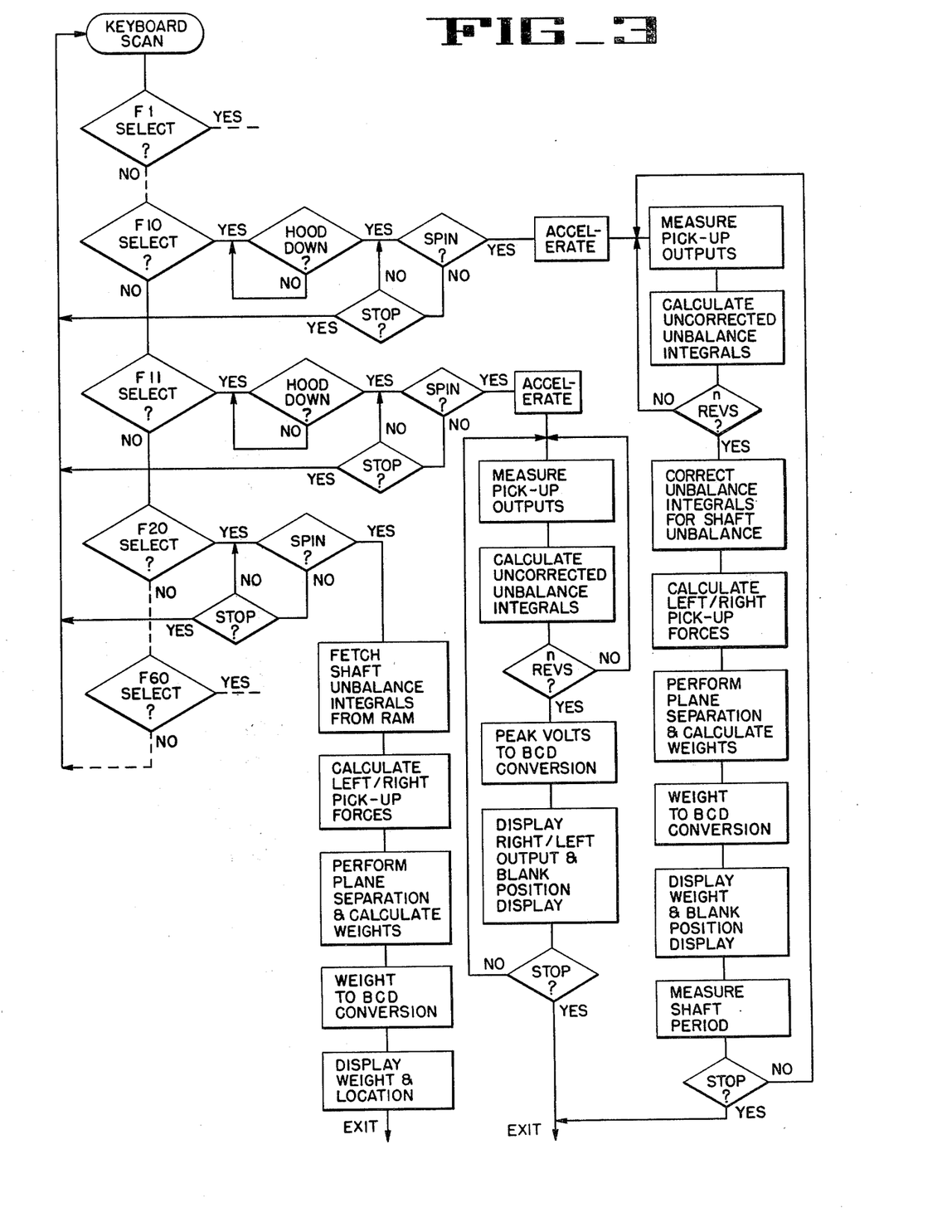
FIG. 3 is a flow chart illustrating the steps in the method of the present invention.

As may be seen by reference to FIG. 1 a keyboard is provided on the front panel 42 having numbered keys ranging from zero through nine and an additional marked "F". The methods by which certain unique self-diagnostic tests may be performed utilizing the apparatus described herein are illustrated in stepwise form by the flow chart of FIG. 3. The processor 61 continually performs a keyboard scan and reinitiates the scan upon each scan completion. The keyboard is interrogated to ascertain if any test instructions have been selected at the keyboard. For illustrative purposes the test instructions are entered by selecting the "F" key together with a numeric code combination. As seen in FIG. 3 certain interrogations are undertaken by the processor 61 which do not pertain to the subject matter of the present invention and are therefore shown by dashed lines in the flow chart. When code F10 is entered in the keyboard and the interrogation at that point in the scan is affirmative, safety considerations require a determination of whether the hood or wheel guard is down in an operating position and whether a wheel spin selection has been made by the balancer operator. Switches indicative of these conditions must be in a select position before the process may be initiated. Moreover, the process once selected may be cancelled by selecting a stop function (FIG. 3) which returns this machine to the keyboard scan. After initiation this method involves accelerating the spin shaft 23 until it reaches approximately 90% of an estimated full speed. The shaft drive from the motor 36 is continued for a predetermined time longer to allow the shaft and any load attached thereto to reach approximately 100% of the estimated full speed. At this point the force transducer outputs are measured and the outputs, which are generally relatively noisy are filtered to substantially eliminate all harmonic content and to retain the fundamental shaft rotation frequency. This filtering is performed in this embodiment by extracting the fundamental from a Fourier series operation which provides uncorrected unbalanced integrals. The data stored in memory relating to unloaded shaft unbalance is then retrieved and the uncorrected unbalance integrals are corrected for shaft unbalance. The forces represented by the left and right pick-ups 29 and 31 are then calculated for a period which includes a predetermined number of shaft revolutions. It has been found convenient to set the number of revolutions of the shaft at 19 in this embodiment so that noise imparted to the fundamental pick-up output frequency from the shaft drive components may be attenuated. Plane separation and unbalance compensation weight magnitude and angular position are calculated in accordance with the relationships developed and defined in the previously referenced copending application. However, these calculations are performed utilizing the wheel parameters which had been entered into the system prior to selecting the "F10" diagnostic test. The weight calculation is converted from digital to binary coded decimal so that the data is compatible with the seven segment displays 46 and 47. The data is corrected for variations in shaft speed during this test so that the displayed weight will not be a function of shaft speed variation.

While the shaft is being continuously rotated by the motor 36 the process of measuring force transducer outputs, filtering, correcting and calculating forces is repeated over a series of periods defined by the predetermined number of shaft revolutions. The data obtained during each period is used to perform the plane separation and weight calculations to thereby obtain new data indicative of weight for display. A new check is made for shaft speed during each period. In this fashion a series of two plane unbalance readings are provided on the display, corrected by any variation in shaft speed during the periods defined by the predetermined number of shaft revolutions so that any instability in the display read-out will be indicative of problems in either the force transducers or the circuitry of FIG. 2 which conditions the force transducer outputs rather than shaft drive instability. The test will continue to be run repetitively until terminated by actuation of the stop switch.

When selection of code F11 is detected during a scan the same interrogations of the hood guard condition and the spin select switch condition are made as discussed hereinbefore in conjunction with the description of the self diagnostic method initiated by selection of code F10. When the guard is down and the spin select switch is actuated the motor 36 runs the shaft 23 up to full speed and maintains the shaft at that speed. When the shaft is estimated at be at full speed the force transducer outputs are measured and the outputs are filtered to preserve the fundamental frequency. Also as described the preferred filtering step in the instant method involves calculation and summation of unbalance integrals from the signals provided by the force transducer outputs by extracting the fundamental signal through a Fourier series operation on the transducer outputs. The shaft is thereafter allowed to rotate through a predetermined number of revolutions, which has conveniently been found to be nineteen revolutions in this embodiment. The peak values of the fundamental frequency in the transducer output signals for the predetermined number of shaft revolutions are detected and the data is converted to binary coded decimal which is compatible with the displays. The average peak fundamental signal level from the force transducers is thereby displayed until a new value is obtained from a subsequent series of measurements over nineteen shaft revolutions. In this fashion the operation of both force transducers may be monitored at the output of the preamplifier stage (Z24 pins 1 and 7, FIG. 2) and the stability of such outputs may be observed over a number of the measurement periods defined by the predetermined number of shaft revolutions during which measurements data is taken. The test will continue to be run as described in accordance with the foregoing method until the stop switch is actuated at which time the shaft will be dynamically braked to a stop.

As the keyboard scan indicated in FIG. 3 of the drawings is pursued a selection made for code F20 will be detected together with detection of a spin switch selection. The position of the hood guard is not material to this test as the shaft is not actually spun. After selection of the code designating this diagnostic process and after actuation of the spin switch, the shaft unbalance integrals are retrieved from random access memory and left and right force transducer forces are calculated using the empty shaft speed (stored in memory) as a simulated speed. Thereafter, plane separation and weight calculation is undertaken using wheel parameters entered prior to selecting the F20 diagnostic. These wheel parameters may be arbitrary and are merely used to provide data necessary for generating recognizable unbalance compensation weight data. The weight data is converted to binary coded decimal which is compatible with the displays and which is displayed thereon together with the location of that amount of weight which would need to be placed on the shaft to counter-balance the unloaded shaft unbalance. This weight and location is retained on the display until a new keyboard selection is made.

Although the best mode contemplated for carrying out the present invention has been herein shown and described, it will be apparent that modification and variation may be made without departing from what is regarded to be the subject matter of the invention.

What is claimed is:

1. A method of detecting errors affecting measurement of wheel unbalance compensation weights taken in a wheel balancer having a rotatable wheel mounting shaft supported in a framework, a wheel mount on the shaft formed to accept a wheel for attachment thereto, a motor coupled to drive the shaft rotationally, left and right force transducers mounted between the framework and the shaft so that they detect mass unbalance in the shaft and in structure secured to the wheel mount during shaft rotation, a display, a processor operating to monitor output from the force transducers, to control the motor and to provide signals coupled to the display indicative of unbalance compensation magnitude and location, and memory associated with the processor operating to store unloaded shaft unbalance and force transducer calibration data, comprising the steps of accelerating the shaft to assume a continuous speed within a predetermined speed range, measuring the force transducer outputs, calculating uncorrected unbalance integrals from the force transducer outputs, correcting the unbalance integrals with the unloaded shaft unbalance data, calculating the forces at the left and right transducers from the corrected unbalance integrals and the stored calibration data for a predetermined number of shaft revolutions, calculating the unbalance compensation weights using a set of arbitrary wheel parameters and the corrected unbalance integrals obtained over the predetermined number of shaft revolutions, and repeating all of the foregoing steps after each completion of the predetermined number of shaft revolutions, whereby a series of compensation weight values is obtained and the stability of the system may be observed.

2. The method of claim 1 together with the step of selecting the predetermined number of shaft revolutions to suppress noise contribution in the uncorrected unbalance integrals from the rotatable shaft drive.

3. The method of claim 1 together with the step of continuously displaying each calculation of unbalance compensation weight on the display until a subsequent calculation is completed.

4. The method of claim 1 together with the step of compensating the unbalance compensation weight calculation for variation in rotatable shaft speed.

5. The method of claim 1 together with the step of converting peak force transducer outputs to a form compatible with the display and displaying each of the force transducer outputs independently on the display.

6. The method of claim 5 together with the step of masking the compensation weight location display.

7. A method of detecting error in measurement of wheel unbalance compensation weights performed by a wheel balancer having a rotatable shaft with a wheel mount thereon, a framework supporting the shaft for rotation therein, a motor coupled to drive the shaft rotationally, force transducers mounted between the framework and the shaft providing output during shaft rotation indicative of mass unbalance in the shaft and in structure secured to the wheel mount, a display, a processor operating to monitor output from the force transducers, to control the motor and to provide outputs coupled to the display which are indicative of unbalance compensation weight magnitude and location, and memory associated with the processor operating to store unloaded shaft unbalance and force transducer calibration data, comprising the steps of continuously driving the shaft at a speed within a predetermined speed range, measuring the force transducer outputs, filtering the force transducer outputs to retain the fundamental frequency and to attenuate harmonic frequencies, the step of filtering occurring over a predetermined number of shaft revolutions, converting the filtered outputs to display-compatible signals, and displaying the converted outputs for a series of periods defined by the predetermined number of shaft revolutions.

8. The method of claim 7 wherein the step of filtering comprises the step of extracting the peak values at the fundamental frequency, whereby a series of peak transducer outputs is displayed.

9. The method of claim 7 wherein the step of filtering comprises the step of calculating uncorrected unbalance integrals from the force transducer outputs.

10. The method of claim 7 wherein the step of filtering comprises the step of calculating uncorrected unbalance integrals from the force transducer outputs together with the step of correcting the unbalance integrals with the unloaded shaft unbalance data.

11. The method of claim 10 including the step of calculating the unbalance compensation weights using an arbitrary set of wheel parameters and the corrected unbalance integrals.

12. The method of claim 11 including the step of serially displaying the calculated unbalance compensation weights for a succession of periods defined by the predetermined number of shaft revolutions.

13. The method of claim 11 together with the step of compensating calculated unbalance compensation weights for variation in shaft rotation speed.

14. The method of claim 7 together with the step of selecting the predetermined number of shaft revolutions of optimize suppression of noise in the filtered force transducer outputs contributed by the step of continuously driving the shaft.

15. A method of detecting errors in measurement of mass unbalance magnitude and location on a wheel balancing machine having a rotatable shaft with a wheel mount attached thereto, a framework supporting the shaft, a motor coupled to rotationally drive the shaft, force transducers positioned between the framework and the shaft providing outputs indicative of mass unbalance in the shaft and in structure attached to the shaft mount during shaft rotation, a display, a processor operating to monitor output from the force transducers, to control the motor and to provide signals coupled to the display indicative of the mass unbalance, and memory associated with the processor operating to store unloaded shaft unbalance and force transducer calibration data, comprising the steps of inhibiting rotation of the shaft, transmitting the unloaded shaft unbalance data to the processor, calculating the force transducer forces corresponding to the unloaded shaft unbalance data and a predetermined shaft rotation speed, calculating the counterweight magnitude and location necessary to counterbalance the measured mass unbalance, and displaying the counterweight magnitude and location, whereby counterweight magnitude and location displayed is shaft unbalance.

16. A method of detecting errors in measurement of mass unbalance magnitude and location on a wheel balancing machine having a rotatable shaft with a wheel mount attached thereto, a framework supporting the shaft, a motor coupled to rotationally drive the shaft, force transducers positioned between the framework and the shaft providing outputs indicative of mass unbalance in the shaft and in structure attached to the shaft mount during shaft rotation, a display, a processor operating to monitor output from the force transducers, to control the motor and to provide signals coupled to the display indicative of the mass unbalance, and memory associated with the processor operating to store unloaded shaft unbalance and force transducer calibration data, comprising the steps of driving the shaft rotationally to a predetermined shaft rotation speed, maintaining substantially the same shaft speed, transmitting the unloaded shaft unbalance data to the processor, measuring the force transducer outputs, filtering the force transducer outputs to retain the fundamental frequency and to attenuate harmonic frequencies, the filtered transducer output measuring step occurring over a predetermined number of shaft revolutions, converting the filtered outputs to display compatible signals, and serially displaying the converted outputs corresponding to data obtained during subsequent periods defined by the predetermined number of shaft revolutions.

17. The method of claim 16 wherein the step of filtering comprises the step of extracting the peak values of the fundamental, whereby a series of peak transducer outputs is displayed.

18. The method of claim 16 wherein the step of filtering comprises the step of calculating uncorrected unbalance integrals from the force transducer outputs.

19. The method of claim 16 wherein the step of filtering comprises the step of calculating uncorrected unbalance integrals from the force transducer outputs together with the step of correcting the unbalance integrals with the unloaded shaft unbalance data.

20. The method of claim 19 including the step of calculating the unbalance compensation weights using an abritrary set of wheel parameters and the corrected unbalance integrals.

21. The method of claim 20 including the step of serially displaying the calculated unbalance compensation weights for a succession of periods defined by the predetermined number of shaft revolutions.

22. The method of claim 20 together with the step of compensating calculated unbalance compensation weights for variation in shaft rotation speed.

23. The method of claim 16 together with the step of selecting the predetermined number of shaft revolutions to optimize suppression of noise in the filtered force transducer outputs contributed by the step of continuously driving the shaft.

24. A method of detecting errors affecting measurement of mass unbalance magnitude and location using a wheel balancing machine having a rotatable shaft with a wheel mount attached thereto, a framework supporting the shaft, a motor coupled to rotationally drive the shaft, force transducers positioned between the framework and the shaft providing outputs indicative of mass unbalance in the shaft and in structure attached to the shaft mount during shaft rotation, a display, and a processor operating to monitor output from the force transducers, to control the motor and to provide signals coupled to the display indicatove of the mass unbalance, comprising the steps of continuously driving the shaft rotationally to assume a speed within a predetermined speed range, sensing the force transducer outputs, filtering the force transducer outputs to retain the fundamental output frequency and to attenuate harmonic frequencies, calculating transducer forces from the filtered outputs for a predetermined number of shaft revolutions, calculating the balance weight and position necessary to counterbalance the mass unbalance utilizing the calculated transducer forces and arbitrary wheel parameters, and repeating the foregoing sequence of steps after each period defined by the predetermined number of shaft revolutions, so that a series of compensation weight values is obtained indicative of the stability of the system.

25. The method of claim 24 wherein the step of filtering comprises the step of calculating uncorrected unbalance integrals from the force transducer outputs.

26. The method of claim 24 together with the step of compensating calculated unbalance compensation weights for variation in shaft rotation speed.

27. The method of claim 24 together with the step of selecting the predetermined number of shaft revolutions to optimize suppression of noise in the filtered force transducer outputs contributed by the step of continuously driving the shaft.

28. A method of detecting errors affecting measurement of mass unbalance magnitude and location using a wheel balancing machine having a rotatable shaft with a wheel mount attached thereto, a framework supporting the shaft, a motor coupled to rotationally drive the shaft, force transducers positioned between the framework and the shaft providing outputs indicative of mass unbalance in the shaft and in structure attached to the shaft mount during shaft rotation, a display, and a processor operating to monitor output from the force transducers, to control the motor and to provide signals coupled to the display indicative of the mass unbalance, comprising the steps of continuously driving the shaft rotationally to assume a speed within a predetermined speed range, sensing the force transducer outputs, converting the force transducer outputs to display compatible signals, displaying the converted outputs for a series of periods each defined by a predetermined number of shaft revolutions.

29. The method of claim 28 together with the steps of conditioning the sensed force transducer outputs to retain the fundamental frequency and to attenuate harmonic frequencies, the step of conditioning occurring during each of the series of periods, and extracting the peak values of the force transducer signal at the fundamental frequency, whereby a series of peak transducer outputs is displayed.

30. The method of claim 28 together with the steps of conditioning the sensed force transducer outputs to retain the fundamental frequency and to attenuate harmonic frequencies, the step of conditioning occurring during each of the series of periods, and calculating unbalance integrals from the force transducer outputs, whereby a series of unbalance compensation weight indications is displayed.

* * * * *